N. T. SPEAR.

Corn Husker.

No. 21,522.

Patented Sept. 14, 1858.

UNITED STATES PATENT OFFICE.

N. T. SPEAR, OF BOSTON, MASSACHUSETTS.

CORN-HUSKER.

Specification of Letters Patent No. 21,522, dated September 14, 1858.

*To all whom it may concern:*

Be it known that I, N. T. SPEAR, of Boston, in the county of Suffolk and State of Massachusetts, have invented a new and Improved Machine for Husking Maize or Indian Corn; and I do hereby declare that the following is a full, clear, and exact description of the same, reference being had to the annexed drawings, making a part of this specification, in which—

Figure 1:
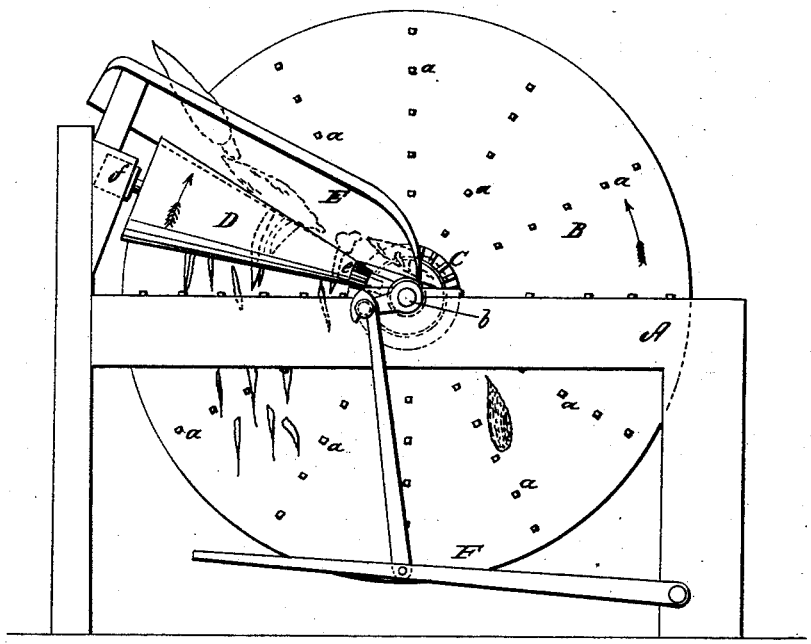
Figure 2:
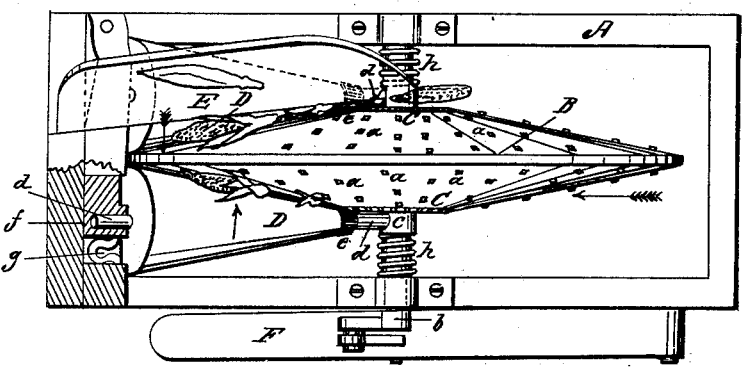

Figure 1, is a side view of my invention. Fig. 2, is a plan or top view of ditto, a portion of the frame being broken away in order to show the upper bearing of one of the conical rollers.

Similar letters of reference indicate corresponding parts in the two figures.

This invention consists in the employment or use of a rotating beveled face wheel armed with teeth and used in connection with conical taper rollers, one or more, having their journals fitted in yielding bearings and arranged in such relation with the wheel as hereinafter fully shown and described, that the ears of corn are allowed to descend by their own gravity down the "bite" or angle formed by the contact of the wheel and rollers, and the husks stripped therefrom in an expeditious and perfect manner.

To enable those skilled in the art to fully understand and construct my invention I will proceed to describe it.

A, represents a rectangular frame which may be constructed in any proper way to support the working parts.

B, represents a wheel both sides of faces of which are beveled from or near its center to its periphery. This wheel is of cast metal formed of two equal parts of conical shell form placed base to base and secured by bolts or otherwise near their peripheries. Each side of the wheel B, is armed with teeth $a$, which may be placed in radial rows, the teeth of one row being in line with the centers of the spaces of those at the sides of it. The teeth $a$ project but a trifle beyond the faces of the wheel B, and they are nearly flat at their outer surfaces, their front edges slightly projecting.

At the center of each face or side of the wheel B, a bevel wheel C, is attached, and on the shaft $b$, of the wheel collars $c$, are placed loosely, one at each side. The collars $c$, $c$, form the lower bearings for the axes $d$, of conical rollers D, D, which have each a pinion $e$, on their lower ends, said pinions gearing into the wheels C. The upper end of the axes $d$, fit in bearings $f$, which are placed in recesses in the frame A, and have each a spring $g$, at their outer sides see Fig. 2. On the shaft $b$, and between each collar $c$, and the opposite bearing a spiral spring $h$, is placed, said springs having a tendency to keep the pinions $e$, in gear with the wheels C, and the rollers pressed against the faces of the wheel. The rollers D, D, are of conical form and have smooth peripheries which work in contact with the sides or faces of the wheel B. The rollers D, D, are placed in inclined positions but radially with the wheel B, and over each roller an inclined board E, is placed. The wheel B, may be rotated by means of a treadle F, or by other proper means. The arrow indicates the direction in which said wheel and also the rollers rotate.

The ears of corn are placed by hand on the board E, butt foremost, at least that is the most favorable position, and the husks are caught by the teeth $a$, and carried to the "bite" or the point of contact of the rollers and wheel, and the husks are stripped directly from the ear, the latter not being drawn down between the rollers and wheel in consequence of the angle of the "bite" being too obtuse to catch or bind the ears. In case however the butt of the ear is long it will be caught in the "bite" and broken off. The husks therefore and butts pass down between the rollers and wheel and the ears, deprived of their integuments, fall from the lower ends of the boards E, E. The yielding bearings $c$, $f$, allow the rollers D, to give so as to compensate for the varying thickness of husks and butts passing between them and the wheel.

I prefer of course constructing the wheel B, with two face sides, each side having a roller D, as shown in Fig. 2. By this means the work may be performed more rapidly than usual. One face side however may be used if desired.

This machine has been practically tested and it performs its work readily and in a perfect manner.

What I claim as my invention, and desire to secure by Letters Patent, is:

The combination and arrangement of the toothed beveled wheel B, provided with one or more faces, with the smooth conical rollers D, D, one or more, and boards E, when these several parts are united together and arranged for joint operation substantially in the manner and for the purpose set forth.

N. T. SPEAR.

Witnesses:
  MICH. HUGHES,
  J. W. COOMBS.